United States Patent

Fujimoto

Patent Number: 6,065,298
Date of Patent: May 23, 2000

[54] AIR CONDITIONER AUTOMATICALLY CONTROLLING OPERATION BASED ON SUPPLY VOLTAGE OR SUPPLY FREQUENCY

[75] Inventor: Satoru Fujimoto, Kashihara, Japan

[73] Assignee: Sharp Kabushiki Kaisha, Osaka, Japan

[21] Appl. No.: 09/099,348

[22] Filed: Jun. 18, 1998

[30] Foreign Application Priority Data

Jun. 20, 1997 [JP] Japan ................................ 9-164401

[51] Int. Cl.⁷ .............................. F24F 11/02; F25B 1/00
[52] U.S. Cl. .............................. 62/230; 62/228.4; 62/129
[58] Field of Search .................................. 62/230, 228.1, 62/228.4, 228.5, 126, 129; 307/21, 33; 363/109; 361/30, 31, 33

[56] References Cited

U.S. PATENT DOCUMENTS

| 5,107,685 | 4/1992 | Kobayashi | 62/230 X |
| 5,209,075 | 5/1993 | Kim | 62/230 X |
| 5,493,868 | 2/1996 | Kikuiri et al. | 62/228.4 X |
| 5,709,098 | 1/1998 | Itoh et al. | 62/228.4 |
| 5,771,704 | 6/1998 | Nakajima et al. | 62/230 X |

FOREIGN PATENT DOCUMENTS

| 61-190233 | 8/1986 | Japan . |
| 2-303361 | 12/1990 | Japan . |
| 5-44980 | 2/1993 | Japan . |
| 5-199795 | 8/1993 | Japan . |
| 6-69638 | 3/1994 | Japan . |
| 6-101896 | 4/1994 | Japan . |
| 9-210424 | 8/1997 | Japan . |

*Primary Examiner*—Harry B. Tanner

[57] ABSTRACT

An air conditioner includes: a current detection unit for detecting a current value of alternating current power supplied from an alternating current power source; an indoor fan motor for exchanging heat of refrigerant for indoor heat; an outdoor fan motor for exchanging the heat of the refrigerant for outdoor heat; a compressor connected to an indoor heat exchanger and an outdoor heat exchanger where heat exchanging is carried out by the indoor fan motor and the outdoor fan motor respectively, for compressing the refrigerant; a refrigerant decompression unit connected to the indoor and outdoor heat exchangers for decompressing the refrigerant; a drive control unit receiving the alternating current power from the alternating current power source for controlling drive of the compressor; a voltage detection unit for detecting a voltage value supplied from the alternating current power source to the drive control unit; and a microcomputer receiving the current value detected by the current detection unit and the voltage value detected by the voltage detection unit for correcting a control level of the current value based on the voltage value and for controlling any one of or at least two of the drive control unit, the refrigerant decompression unit, and the indoor and outdoor fan motors by the control level of the current value.

14 Claims, 6 Drawing Sheets

AIR CONDITIONER AUTOMATICALLY CONTROLLING OPERATION BASED ON SUPPLY VOLTAGE OR SUPPLY FREQUENCY

BACKGROUND OF THE INVENTION

1. Field of the Invention

The present invention relates to an air conditioner, and more particularly to an air conditioner which automatically controls operation based on supply voltage or supply frequency.

2. Description of the Background Art

An air conditioner which detects operating current, controls a compressor and a fan motor, and controls switch timing of a defrosting operation has been developed recently. Examples of such an air conditioner are those disclosed in Japanese Patent Laying-Open No. 6-101896 and Japanese Patent Laying-Open No. 5-44980.

Referring to FIG. 1, the air conditioner disclosed in Japanese Patent Laying-Open No. 6-101896 includes: a current detector 20; a rectifying/smoothing unit 2 connected to an output of current detector 20; an inverter 23 connected to an output of rectifying/smoothing unit 2 and a microcomputer 21 which is described later; a compressor motor 22 connected to an output of inverter 23; a fan drive unit 26 connected to the output of current detector 20 and microcomputer 21; a fan motor 24 connected to an output of fan drive unit 26; an outside air temperature detector 25; and microcomputer 21 controlling respective units such as fan drive unit 26 and inverter 23 based on an output from current detector 20 and an output from outside air temperature detector 25.

Current detector 20 detects a total amount of input current fed by the power supply. Rectifying/smoothing unit 2 rectifies and smoothes alternating current diverging from the input current. Inverter 23 obtains alternating current in a prescribed frequency range from direct current output from rectifying/smoothing unit 2, based on an inverter control signal output from microcomputer 21. Compressor motor 22 receives the alternating current output from inverter 23, and compresses refrigerant in a refrigerating cycle. Fan drive unit 26 controls a rotating speed of fan motor 24 based on a fan drive control signal output from microcomputer 21. Fan motor 24 promotes heat dissipation from a heat exchanger, electronic parts and the like. Microcomputer 21 controls inverter 23 and fan drive unit 26 based on the total amount of the input current detected by current detector 20 and based on an outside air temperature.

Referring to FIG. 2, the air conditioner disclosed in the Japanese Patent Laying-Open No. 6-101896 operates as follows. The steps S1, S2 and S5 in the figure relate to control of each unit of the air conditioner based on the outside air temperature output from outside temperature detector 25. The steps S3 and S4 relate to control of each unit of the air conditioner based on the total amount of the input current output from current detector 20.

Microcomputer 21 determines whether the outside air temperature detected by outside air temperature detector 25 has a prescribed set value or less (step S1). If the outside air temperature is equal to or less than the prescribed set value (YES in step S1), microcomputer 21 transmits a fan drive control signal to fan drive unit 26 to allow fan motor 24 to perform a normal operation. Fan drive unit 26 receiving the fan drive control signal enables fan motor 24 to carry out the normal operation (step S5). The step S1 is thereafter carried out again.

If the outside air temperature is more than the prescribed set value (NO in step S1), microcomputer 21 transmits a fan drive control signal to fan drive unit 26 such that drive current of fan motor 24 attains the maximum value. Fan drive unit 26 receiving the fan drive control signal makes the drive current of fan motor 24 maximum (step S2). A process of step S3 is thereafter performed.

In step S3, microcomputer 21 determines whether the input current detected by current detector 20 is equal to or less than a prescribed maximum value (step S3). If the input current has the prescribed maximum value or less (YES in step S3), the process of step S1 is carried out with the current state maintained. If the input current exceeds the prescribed maximum value (NO in step S3), microcomputer 21 transmits an inverter control signal to inverter 23 to decrease frequency of inverter 23 (step S4). Accordingly, an output from compressor motor 22 is reduced.

Referring to FIG. 3, the air conditioner disclosed in the Japanese Patent Laying-Open No. 5-44980 includes: an alternating current power supply 7; a sensor 27; a rectifier 31; an inverter 29; a compressor 30; an inverter output current detection sensor 28; a power consumption computing unit 32; and an air conditioning controller 33.

Sensor 27 detects power consumption of an input portion of the air conditioner. Inverter output current detection sensor 28 detects a value of output current of inverter 29 supplied from inverter 29 to compressor 30. Power consumption computing unit 32 receives the power consumption of the input portion of the air conditioner, the value of output current of inverter 29, and a voltage value of current supplied to inverter 29 obtained by smoothing an output from rectifier 31, and calculates power consumption of the air conditioner. Air conditioning controller 33 receives the power consumption calculated by power consumption computing unit 32, and determines operating frequency of compressor 30 to make a capacity controllable. Air conditioning controller 33 drives inverter 29 with this frequency, and controls the air conditioner such that the highest limit of power consumption of the air conditioner has a prescribed set value or less.

The conventional air conditioners as described above are controlled to prevent current value and power consumption of the air conditioner from increasing to a fixed value or more. On the other hand, control for securing reliability of the an conditioner, or control of an operation switch timing is possible. However, for example, in Europe where supply voltage is different according to countries, if the same air conditioner is used, current varies depending on supply voltage. Therefore, it is difficult to appropriately control an air conditioner using the same detected current value. In such a country as Japan where supply frequency is different according to regions, an air conditioner, including a motor or the like having its current value which is dramatically changed according to frequencies, can not be stably and reliably controlled using the same current value.

SUMMARY OF THE INVENTION

The present invention is made to solve the problem described above. An object of the invention is to provide an efficient air conditioner which can be appropriately controlled even if supply voltage changes.

Another object of the present invention is to provide an efficient air conditioner which can be appropriately controlled even if power supply frequency changes.

Still another object of the present invention is to provide an efficient air conditioner having an inverter-driven compressor which is controlled with a desired effective output voltage value which is highly efficient even if voltage and frequency of power supply change.

An air conditioner according to one aspect of the present invention includes: a current detection unit for detecting a current value of alternating current power supplied from alternating current power source; an indoor fan motor for exchanging heat of refrigerant for indoor heat; an outdoor fan motor for exchanging the heat of the refrigerant for outdoor heat; a compressor connected to an indoor heat exchanger and an outdoor heat exchanger where heat exchanging is carried out by the indoor fan motor and the outdoor fan motor respectively, for compressing the refrigerant; a refrigerant decompression unit connected to the indoor heat exchanger and the outdoor heat exchanger for decompressing the refrigerant; a drive control unit receiving the alternating current power from the alternating current power source for controlling drive of the compressor; a voltage detection unit for detecting a voltage value supplied from the alternating current power source to the drive control unit; and a control unit receiving the current value detected by the current detection unit and the voltage value detected by the voltage detection unit for correcting control levels of the current value based on the voltage value and controlling any one of or at least two of the drive control unit, the refrigerant decompression unit, the indoor fan motor, and the outdoor fan motor respectively by the control levels of the current value.

The control unit controls any one of or at least two of the drive control unit, the refrigerant decompression unit, the indoor fan motor, and the outdoor fan motor based on voltage of the alternating current power source. Consequently, an efficient air conditioner can be provided which can be appropriately controlled even if voltage of the alternating current power source changes.

According to another aspect of the present invention, an air conditioner includes: a current detection unit for detecting a current value of alternating current power supplied from alternating current power source; an indoor fan motor for exchanging heat of refrigerant for indoor heat; an outdoor fan motor for exchanging the heat of the refrigerant for outdoor heat; a compressor connected to an indoor heat exchanger and an outdoor heat exchanger where heat exchanging is carried out by the indoor fan motor and the outdoor fan motor respectively, for compressing the refrigerant; a refrigerant decompression unit connected to the indoor heat exchanger and the outdoor heat exchanger for decompressing the refrigerant; a drive control unit receiving the alternating current power from the alternating current power source for controlling drive of the compressor; a supply frequency detection unit connected to the alternating current power source; and a control unit receiving the current value detected by the current detection unit and an output from the supply frequency detection unit for correcting control levels of the current value based on the output from the supply frequency detection unit and controlling any one of or at least two of the drive control unit, the refrigerant decompression unit, the indoor fan motor, and the outdoor fan motor respectively by the control levels of the current value.

The control unit controls any one of or at least two of the drive control unit, the refrigerant decompression unit, the indoor fan motor and the outdoor fan motor based on frequency of alternating current power source. Accordingly, an efficient air conditioner can be provided which can be appropriately controlled even if frequency of the alternating current power source changes.

According to still another aspect of the present invention, an air conditioner includes: a rectifying and smoothing unit receiving alternating current power supplied from alternating current power source for rectifying and smoothing the alternating current power to derive direct current power; an indoor fan motor for exchanging heat of refrigerant for indoor heat; an outdoor fan motor for exchanging the heat of the refrigerant for outdoor heat; a compressor connected to an indoor heat exchanger and an outdoor heat exchanger where heat exchanging is carried out by the indoor fan motor and the outdoor fan motor respectively, for compressing the refrigerant; a refrigerant decompression unit connected to the indoor heat exchanger and the outdoor heat exchanger for decompressing the refrigerant; an inverter connected to an output of the rectifying and smoothing unit and receiving the direct current power for supplying power having a desired frequency to the compressor; a voltage detection unit connected to the output of the rectifying and smoothing unit for detecting a voltage value of the direct current power supplied to the inverter; and a control unit connected to an output of the voltage detection unit for correcting an effective output voltage value supplied from the inverter to the compressor based on the detected voltage value.

The control unit corrects the effective output voltage value supplied from the inverter to the compressor based on the voltage value of the power supplied to the inverter. Accordingly, an efficient air conditioner can be provided having a compressor which can be controlled with a desired frequency even if voltage and frequency of power source changes.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
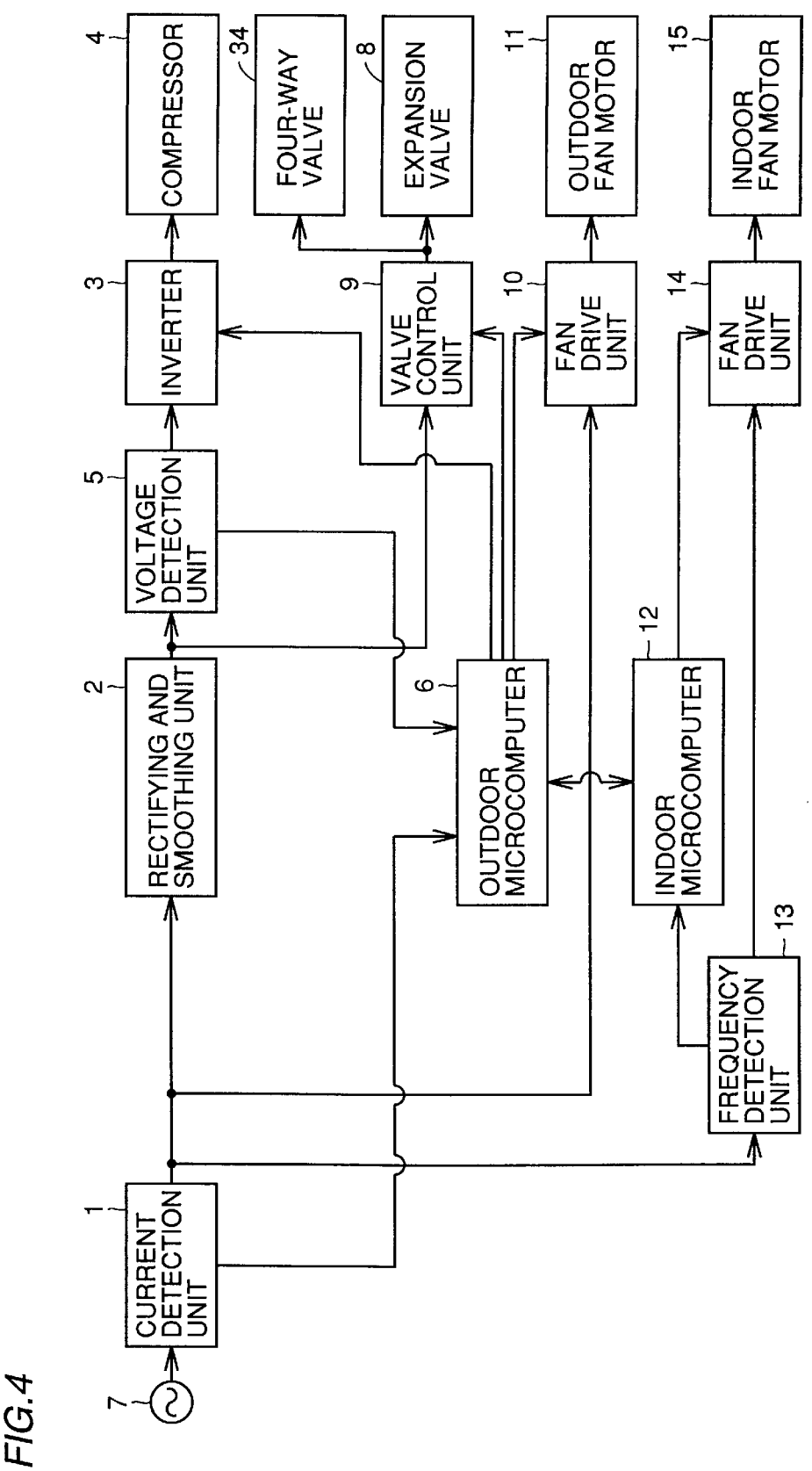
FIG. 4 is a block diagram showing a structure of an air conditioner according to a first embodiment.

Referring to FIG. 4, an air conditioner according to a first embodiment includes: a current detection unit 1 for detecting input current supplied from an alternating current power source 7; a rectifying and smoothing unit 2 for rectifying and smoothing alternating current supplied from alternating current power source 7; a voltage detection unit 5 connected to an output of rectifying and smoothing unit 2 for detecting a voltage value of direct current voltage supplied to an inverter 3 which is described below; an inverter 3 connected to an output of voltage detection unit 5 and receiving direct current output from rectifying and smoothing unit 2 via voltage detection unit 5 for deriving alternating current at a prescribed frequency according to an inverter control signal from an outdoor microcomputer 6 which is described below; and a compressor 4 receiving the alternating current output from inverter 3 for rotating a motor at a prescribed speed of rotation and compressing refrigerant in a refrigerating cycle.

The air conditioner further includes outdoor microcomputer 6 connected to outputs of current detection unit 1, voltage detection unit 5, and an indoor microcomputer 12 (described below) for transmitting control signals respectively to inverter 3, a valve control unit 9, and a fan drive unit 10 according to the current value detected by current detection unit 1 and the voltage value detected by voltage detection unit 5.

The air conditioner still further includes: an expansion valve 8 changing a degree of restriction to expand and decompress the refrigerant for controlling a flow of the refrigerant in the refrigerating cycle; valve control unit 9 connected to the output of rectifying and smoothing unit 2 for adjusting the degree of restriction of expansion valve 8 according to control by outdoor microcomputer 6; an indoor fan motor 15 for exchanging heat of the refrigerant for indoor heat; an outdoor fan motor 11 dissipating heat of an outdoor heat exchanger in the refrigerating cycle for exchanging the heat of the refrigerant for outdoor heat; and a fan drive unit 10 connected to the output of current detection unit 1 for controlling a speed of rotation of outdoor fan motor 11 according to an instruction from outdoor microcomputer 6.

In addition, the air conditioner includes a frequency detection unit 13 connected to the output of current detection unit 1 for detecting frequency of alternating current power source 7, and a fan drive unit 14 receiving alternating current output from alternating current power source 7 via current detection unit 1 and frequency detection unit 13 for controlling a speed of rotation of indoor fan motor 15 according to an instruction from an indoor microcomputer 12 (described below).

Further, the air conditioner includes a four-way valve 34 for switching a source of flow of the refrigerant into compressor 4 and a destination of flow of the refrigerant out of compressor 4 depending on cooling and heating operations according to an instruction from valve control unit 9.

The air conditioner further includes indoor microcomputer 12. Indoor microcomputer 12 communicates information with outdoor microcomputer 6. Indoor microcomputer 12 transmits frequency data obtained from frequency detection unit 13 to outdoor microcomputer 6. Indoor microcomputer 12 receives control information of outdoor fan motor 11 transmitted from outdoor microcomputer 6 and controls fan drive unit 14.

The air conditioner of the first embodiment operates as follows. In cooling operation, the refrigerant circulates from compressor 4, an outdoor heat exchanger (not shown), expansion valve 8, and an indoor heat exchanger (not shown). Compressor 4 compresses the refrigerant to increase pressure and temperature of the refrigerant. Heat of the compressed refrigerant is dissipated by outdoor fan motor 11 provided to the outdoor heat exchanger and heat energy of the refrigerant is reduced. The refrigerant with the reduced heat energy is decompressed by expansion valve 8 and the temperature of the refrigerant is further decreased. The refrigerant having a temperature lower than room temperature is sent to the indoor heat exchanger, and evaporated while the refrigerant deprives the room of its heat by indoor fan motor 15 provided to the indoor heat exchanger.

In heating operation, the refrigerant circulates from compressor 4, the indoor heat exchanger, expansion valve 8 and the outdoor heat exchanger to deliver outdoor heat into the room. Although the refrigerant circulates in opposite directions in cooling and heating operations, the direction of rotation of compressor 4 is constant. Therefore, four-way valve 34 is placed preceding compressor 4 for functioning as a selector valve to change the flow of the refrigerant.

Figure 5:
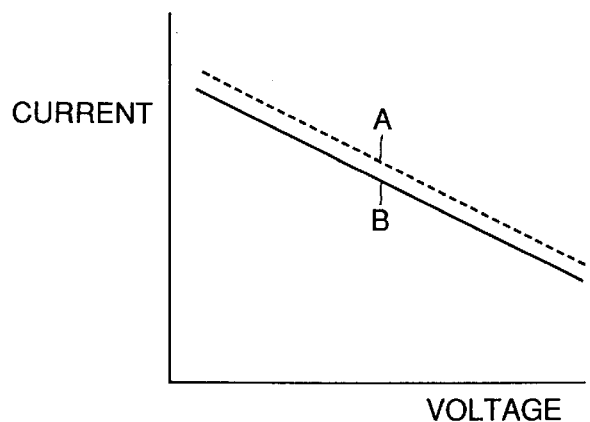
FIG. 5 shows a relation between supply voltage of the air conditioner and operating current of a compressor according to the first embodiment.

FIG. 5 shows a relation between supply voltage and operating current of compressor 4 when operating frequency of compressor 4 is constant in the air conditioner having the inverter-driven compressor shown in FIG. 4. The current decreases as the voltage increases. In the case of the inverter-driven compressor, there is no difference in current of compressor 4 depending on supply frequencies of 50 Hz and 60 Hz. However, if rotation speed of outdoor fan motor 11 and indoor fan motor 15 varies depending on frequencies, an amount of wind generated by the fans changes. As a result, a difference of operating current arises as shown by a broken line A for supply frequency of 50 Hz and a solid line B for supply frequency of 60 Hz.

Figure 6:
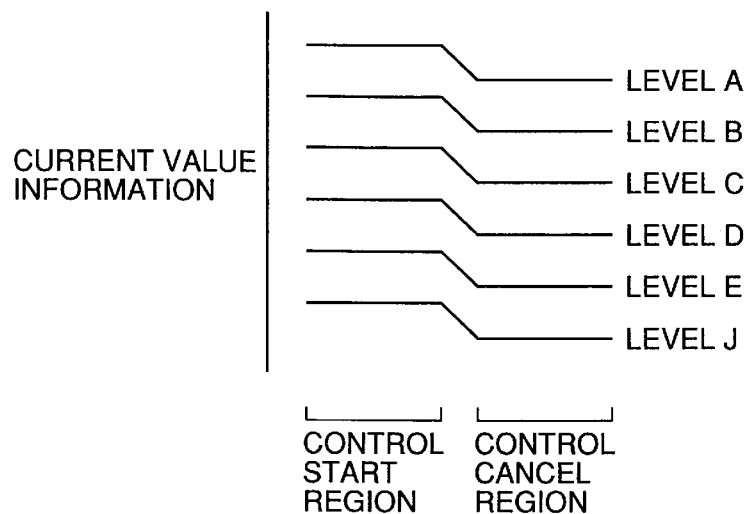
FIG. 6 shows current value information for controlling the air conditioners of the first and second embodiments.

In the air conditioner shown in FIG. 4, information on the current value obtained by current detection unit 1 is supplied to outdoor microcomputer 6 and indoor microcomputer 12. Outdoor microcomputer 6 supplies control signals to inverter 3, valve control unit 9 and fan drive unit 10, and indoor microcomputer 12 supplies a control signal to fan drive unit 14. According to these control signals, inverter 3 changes operating frequency of compressor 4, valve control unit 9 changes a degree of restriction of expansion valve 8, and fan drive units 14 and 10 respectively change speed of rotation of indoor fan motor 15 and outdoor fan motor 11. In this case, in order to maintain reliability of the air conditioner, a hysterisis feature between a control start level and a control cancel level of each level of current value information is provided as shown in FIG. 6.

Specifically, level A is a level for controlling stop of operation of the air conditioner. Level B is a level for controlling decrease of operating frequency of compressor 4. Level C is a level for controlling a degree of restriction of expansion valve 8. Level D is a level for controlling increase of rotating speed of outdoor fan motor 11. Level E is a level for controlling decrease of speed of rotation of indoor fan motor 15. Level J is a level for controlling termination of a defrosting operation. For each level, a current value in a control start region is set higher than a current value in a control cancel region.

A set value of each level described above is determined according to characteristics of refrigerating cycle of an air conditioner and specification of components. These control levels are set in advance along with control flow charts by outdoor microcomputer 6 and indoor microcomputer 12.

These set levels A–J are corrected according to information on voltage and frequency detected by voltage detection unit 5 and frequency detection unit 13. Consequently, the air conditioner can be controlled to operate in the same state such as the same refrigerating cycle state or the same fan control state even if voltage or frequency of power source varies. The air conditioner can be controlled with reliability maintained by preparing flow charts and information for correcting each level into indoor and outdoor microcomputers 12 and 6.

Figure 7:
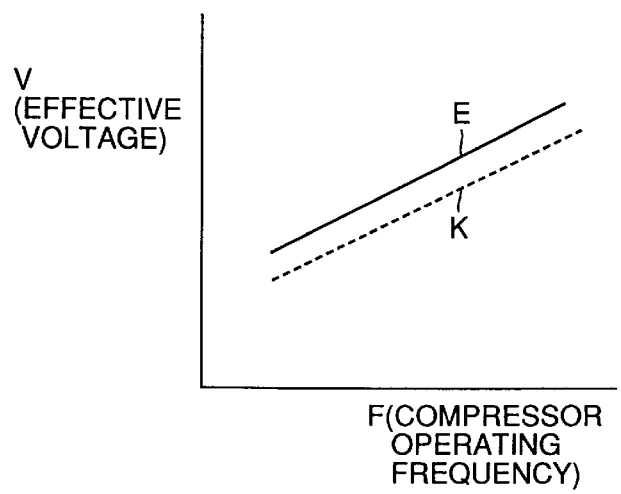
FIG. 7 shows a relation between operating frequency of the compressor and effective voltage.

Magnetic flux $\phi$ of an induction motor of compressor 4 is represented by $\phi=K\cdot V/F$ (K is constant), and thus a relation between operating frequency F of the compressor and effective voltage V which provides an optimum magnetic flux is determined. Therefore, when pulse width modulation is applied, effective voltage V supplied to a compressor motor is preferably changed according to operating frequency F. A correction to the pulse width modulation can be made by correcting compressor operating frequency F according to information from voltage detection unit 5 such that V/F is constant even if supply voltage before the pulse width modulation changes. FIG. 7 shows a relation between compressor operating frequency F and effective voltage V. A solid line E corresponds to a correction by supply voltage to allow V/F to produce an optimum magnetic flux. A solid line K corresponds to a case in which a correction by supply voltage is not carried out when supply voltage decreases.

In the air conditioner according to the first embodiment, as described above, a control level of current information is corrected for giving various control over the air conditioner based on detected information on power supply frequency and voltage. The inverter-driven compressor is controlled such that effective voltage output is corrected based on voltage information to produce an optimum V/F. Accordingly, an efficient air conditioner can be provided by suitably controlling it even if supply voltage or frequency is changed.

Figure 8:
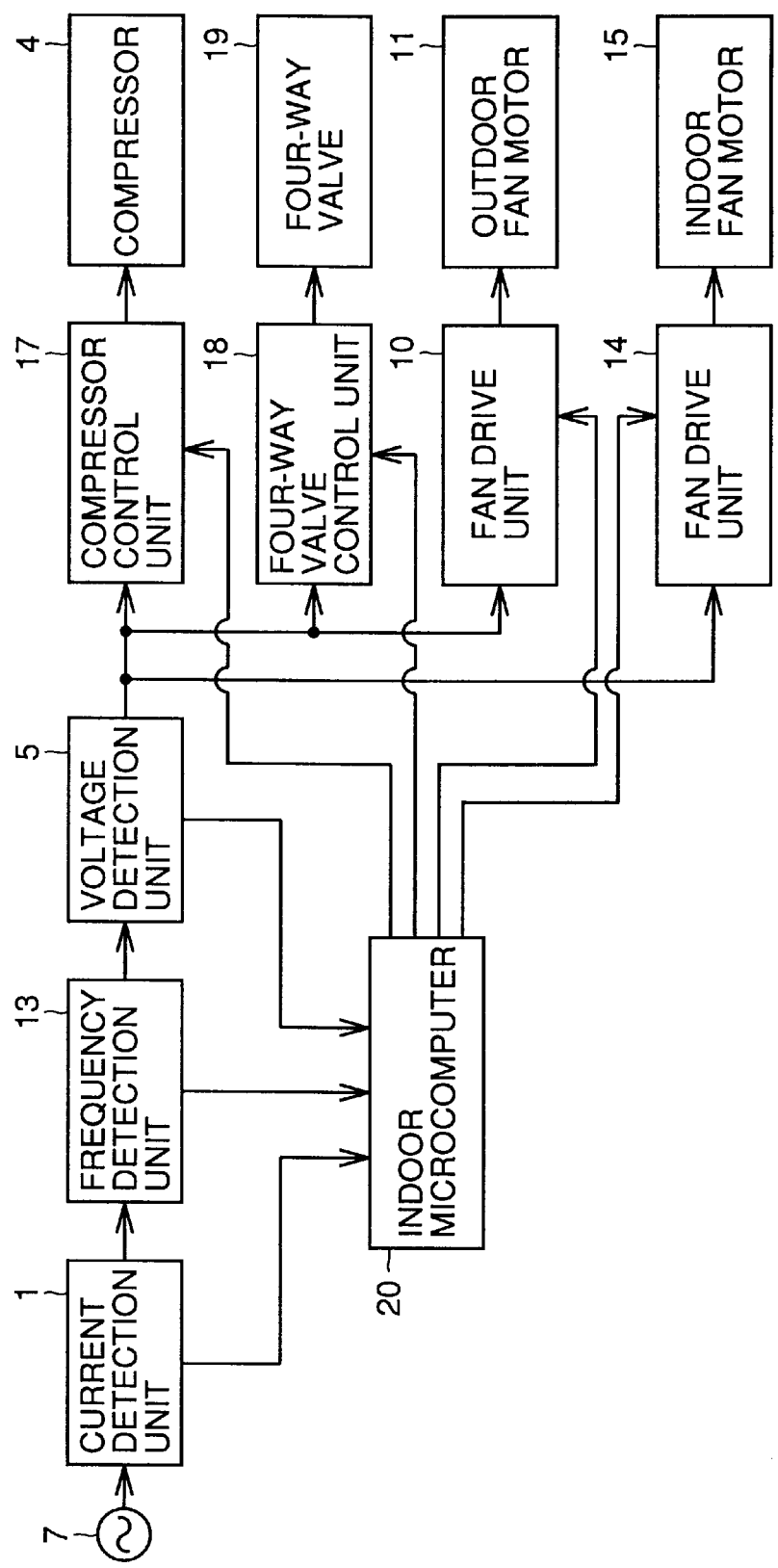
FIG. 8 is a block diagram showing a structure of an air conditioner according to the second embodiment.

Referring to FIG. 8, an air conditioner according to a second embodiment includes: current detection unit 1, frequency detection unit 13, voltage detection unit 5, a compressor control unit 17, compressor 4, an indoor microcomputer 20, a four-way valve control unit 18, a four-way valve 19, fan drive unit 10, outdoor fan motor 11, fan drive unit 14, and indoor fan motor 15.

Components that are the same as those of the air conditioner of the first embodiment described referring to FIG. 4 have the same reference characters. Names and functions of those components are similar and repetition of description thereof is appropriately omitted.

Current detection unit 1 is connected to alternating current power source 7. Frequency detection unit 13 is connected to an output of current detection unit 1. Voltage detection unit 5 is connected to an output of frequency detection unit 13. Compressor control unit 17 is connected to both of the outputs of voltage detection unit 5 and indoor microcomputer 20. Compressor 4 is connected to an output of compressor control unit 17. Indoor microcomputer 20 is connected to all of the outputs of current detection unit 1, frequency detection unit 13 and voltage detection unit 5. Four-way valve control unit 18 is connected to both of outputs of voltage detection unit 5 and indoor microcomputer 20. Four-way valve 19 is connected to an output of four-way valve control unit 18. Fan drive unit 10 is connected to both of the outputs of voltage detection unit 5 and indoor microcomputer 20. Outdoor fan motor 11 is connected to an output of fan drive unit 10. Fan drive unit 14 is connected to the output of voltage detection unit 5 and the output of indoor microcomputer 20. Indoor fan motor 15 is connected to an output of fan drive unit 14.

The air conditioner of the second embodiment is provided with compressor 4 which is not driven by an inverter. Compressor control unit 17 controls ON and OFF of compressor 4. Four-way valve control unit 18 changes a circulation path of a refrigerant in refrigerating cycle for switching cooling operation and heating operation as well as heating operation and defrosting operation. Indoor microcomputer 20 has a function of controlling operations of indoor and outdoor components. Four-way valve 19 of the second embodiment has a function of expansion valve 8 in addition to its own function. Instead of providing four-way valve 19 with the function of expansion valve 8, a capillary tube for decompressing refrigerant may be provided to the air conditioner with a four-way valve.

Figure 9:
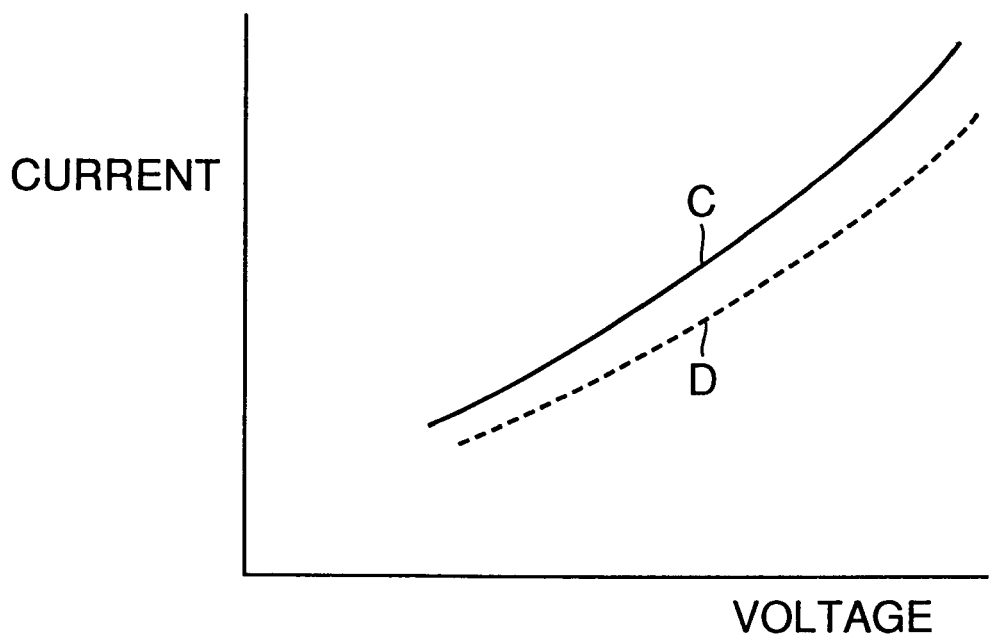
FIG. 9 shows a relation between supply voltage of the air conditioner and operating current of a compressor according to the second embodiment.
Figure 2:
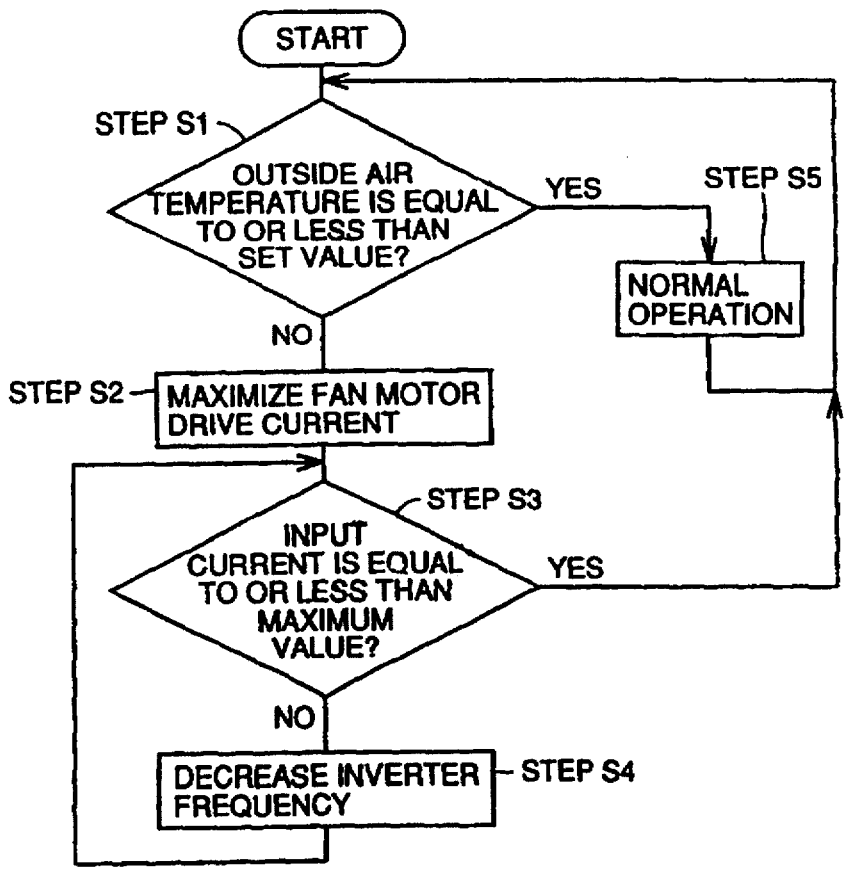
Figure 3:
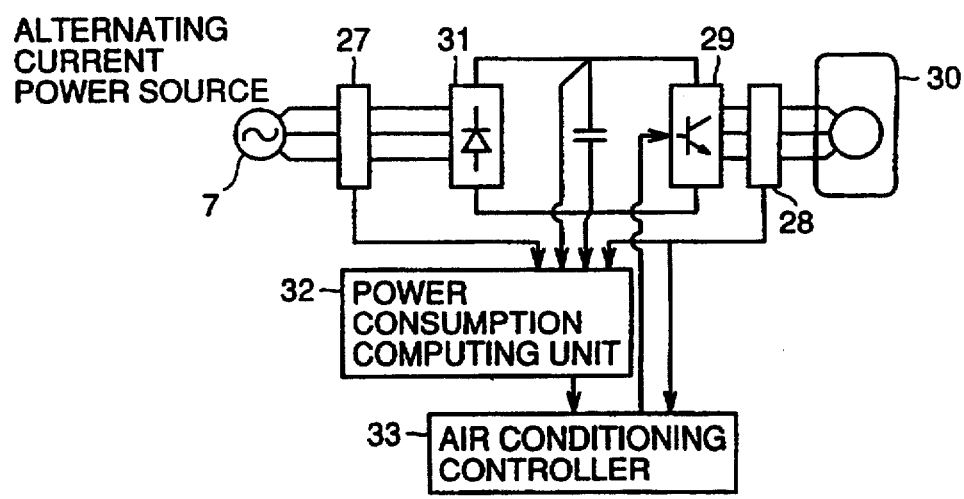

The air conditioner according to the second embodiment operates as follows. FIG. 9 shows a relation between supply voltage and operating current when operating frequency of compressor 4 is constant, in the air conditioner using the compressor which is not driven by an inverter shown in FIG. 8. As shown in FIG. 9, current increases as voltage increases. Further, input current to compressor 4 which is a major part of input current is different depending on frequencies. As a result, a difference in operating current is generated as shown in a solid line C corresponding to supply frequency of 60 Hz and a broken line D corresponding to frequency of 50 Hz.

In the air conditioner shown in FIG. 8, current value information obtained by current detection unit 1 is supplied to indoor microcomputer 20. Indoor microcomputer 20 supplies control signals respectively to compressor control unit 17, four-way valve control unit 18 and fan drive units 10 and 14. According to these control signals, compressor control unit 17 turns on or off compressor 4, four-way valve control unit 18 changes a degree of restriction of four-way valve 19, and fan drive units 14 and 10 change speed of rotation of each of indoor fan motor 15 and outdoor fan motor 11. In order to secure reliability of the air conditioner, a hysteresis feature between a control start level and a control cancel level of each level of current value information is provided as shown in FIG. 6.

Specifically, level A is a level for controlling stop of an operation of the air conditioner, for example. Level B is a level for controlling decrease of operating frequency of compressor 4. Level C is a level for controlling open/close of four-way valve 19. Level D is a level for controlling increase of rotating speed of outdoor fan motor 11. Level E is a level for controlling decrease of speed of rotation of indoor fan motor 15. Level J is a level for controlling termination of a defrosting operation. A current value in a control start region is set higher than a current value in a control cancel region for each level.

A set value of each level is determined according to characteristics of a refrigerating cycle of the air conditioner as well as specification of components. Control levels are set along with a control flow chart in advance in indoor microcomputer 20.

A correction is made to each of set levels A–J according to information on voltage and frequency detected by voltage detection unit 5 and frequency detection unit 13. Accordingly, even if supply voltage and frequency change, the air conditioner can be controlled such that the air conditioner operates in the same state such as the same refrigerating cycle state and the same fan control state. The air conditioner can be efficiently controlled by preparing a flow chart and information for correcting each level in indoor microcomputer 20.

In the air conditioner according to the second embodiment, control levels of current information are corrected to make various settings for the air conditioner based on detected information on supply frequency and voltage as described above. Consequently, an efficient air conditioner can be provided by appropriately controlling it even if supply voltage or frequency changes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An air conditioner comprising:

current detection means for detecting a current value of alternating current power supplied from an alternating current power source;

indoor heat exchanging means for exchanging heat a of refrigerant for indoor heat;

outdoor heat exchanging means for exchanging the heat of said refrigerant for outdoor heat;

refrigerant compression means, connected to said indoor heat exchanging means and said outdoor heat exchanging means, for compressing said refrigerant;

refrigerant decompression means connected to said indoor heat exchanging means and said outdoor heat exchanging means, for decompressing said refrigerant;

drive control means, receiving said alternating current power from said alternating current power source, for controlling drive of said refrigerant compression means;

voltage detection means for detecting a voltage value supplied from said alternating current power source to said drive control means; and control means, receiving said current value detected by said current detection means and said voltage value detected by said voltage detection means, for correcting a control level of said current value based on said voltage value and for controlling any one of or at least two of said drive control means, said refrigerant decompression means, said indoor heat exchanging means, and said outdoor heat exchanging means by said corrected control level of said current value.

2. The air conditioner according to claim 1, wherein said control means comprises:

means, receiving said current value detected by said current detection means and said voltage value detected by said voltage detection means, for correcting the control level of said current value and correcting a control level of a control start point to be higher than a control level of a control end point based on said voltage value, and for controlling any one of or at least two of said drive control means, said refrigerant decompression means, said indoor heat exchanging means and said outdoor heat exchanging means by said corrected control level of said current value.

3. The air conditioner according to claim 1, further comprising:

supply frequency detection means connected to said alternating current power source, for detecting supply frequency, said control means including first means, receiving said current value detected by said current detection means, said voltage value detected by said voltage detection means, and an output from said supply frequency detection means, for correcting the control level of said current value based on said voltage value and the output from said supply frequency detection means and for controlling any one of or at least two of said drive control means, said refrigerant decompression means, said indoor heat exchanging means and said outdoor heat exchanging means by said corrected control level of said current value.

4. The air conditioner according to claim 3, wherein said first means comprises:

second means, receiving said current value detected by said current detection means, said voltage value detected by said voltage detection means, and the output from said supply frequency detection means, for correcting the control level of said current value and correcting a control level of a control start point to be higher than a control level of a control end point based on said voltage value and the output from said supply frequency detection means, and for controlling any one of or at least two of said drive control means, said refrigerant decompression means, said indoor heat exchanging means, and said outdoor heat exchanging means by said corrected control level of said current value.

5. The air conditioner according to claim 1, wherein said refrigerant decompression means includes an expansion valve, connected to said indoor heat exchanging means and said outdoor heat exchanging means, for changing a flow of said refrigerant, the air conditioner further including valve control means, receiving said alternating current power from said alternating current power source, for changing a degree of restriction of said expansion valve and adjusting the flow of said refrigerant, said control means including means, receiving said current value detected by said current detection means and said voltage value detected by said voltage detection means, for correcting the control level of said current value based on said voltage value and for controlling any one of or at least two of said drive control means, said refrigerant decompression means, said indoor heat exchanging means, said outdoor heat exchanging means and said valve control means by said corrected control level of said current value.

6. An air conditioner comprising:

current detection means for detecting a current value of alternating current power supplied from an alternating current power source;

indoor heat exchanging means for exchanging heat of a refrigerant for indoor heat;

outdoor heat exchanging means for exchanging the heat of said refrigerant for outdoor heat;

refrigerant compression means, connected to said indoor heat exchanging means and said outdoor heat exchanging means, for compressing said refrigerant;

refrigerant decompression means, connected to said indoor heat exchanging means and said outdoor heat exchanging means, for decompressing said refrigerant;

drive control means, receiving said alternating current power from said alternating current power source, for controlling drive of said refrigerant compression means;

supply frequency detection means, connected to said alternating current power source, for detecting supply frequency; and control means, receiving said current value detected by said current detection means and an output from said supply frequency detection means, for correcting a control level of said current value based on the output from said supply frequency detection means and for controlling any one of or at least two of said drive control means, said refrigerant decompression means, said indoor heat exchanging means, and said outdoor heat exchanging means by said corrected control level of said current value.

7. The air conditioner according to claim 6, wherein said control means comprises:

means, receiving said current value detected by said current detection means and the output from said supply frequency detection means, for correcting the control level of said current value and correcting a control level of a control start point to be higher than a control level of a control end point based on the output from said supply frequency detection means, and for controlling any one of or at least two of said drive control means, said refrigerant decompression means, said indoor heat exchanging means, and said outdoor heat exchanging means by said corrected control level of said current value.

8. The air conditioner according to claim 6, wherein said refrigerant decompression means includes an expansion valve, connected to said indoor heat exchanging means and said outdoor heat exchanging means, for changing a flow of said refrigerant, the air conditioner further including valve control means, receiving said alternating current power from said alternating current power source, for changing a degree of restriction of said expansion valve and adjusting the flow of said refrigerant, said control means including means, receiving said current value detected by said current detection means and the output from said supply frequency detection means, for correcting the control level of said current value based on the output from said supply frequency detection means and for controlling any one of or at least two of said drive control means, said refrigerant decompression means, said indoor heat exchanging means, said outdoor heat exchanging means and said valve control means by said corrected control level of said current value.

9. An air conditioner comprising:

rectifying and smoothing means, receiving alternating current power supplied from an alternating current power source, for rectifying and smoothing said alternating current power to derive direct current power;

indoor heat exchanging means for exchanging heat of a refrigerant for indoor heat;

outdoor heat exchanging means for exchanging the heat of said refrigerant for outdoor heat;

refrigerant compression means, connected to said indoor heat exchanging means and said outdoor heat exchanging means, for compressing said refrigerant;

refrigerant decompression means, connected to said indoor heat exchanging means and said outdoor heat exchanging means, for decompressing said refrigerant;

frequency converting means, connected to an output of said rectifying and smoothing means and receiving said direct current power, for supplying power at a desired frequency to said refrigerant compression means;

voltage detection means, connected to the output of said rectifying and smoothing means, for detecting a voltage value of said direct current power supplied to said frequency converting means; and control means, connected to an output of said voltage detection means, for correcting, based on said voltage value, an effective output voltage value of the supplied power provided from said frequency converting means to said refrigerant compression means.

10. The air conditioner according to claim 9, further comprising current detection means for detecting a current value of said alternating current power supplied from said alternating current power source, said control means comprising:

first means, connected to the output of said voltage detection means, for correcting, based on said voltage value, the effective output voltage value of the supplied power provided from said frequency converting means to said refrigerant compression means; and second means, receiving said current value detected by said current detection means and said voltage value detected by said voltage detection means, for correcting a control level of said current value based on said voltage value and for controlling any one of or at least two of said frequency converting means, said refrigerant decompression means, said indoor heat exchanging means, and said outdoor heat exchanging means by said corrected control level of said current value.

11. The air conditioner according to claim 10, wherein said second means comprises:

means, receiving said current value detected by said current detection means and said voltage value detected by said voltage detection means, for correcting the control level of said current value and correcting a control level of a control start point to be higher than a control level of a control end point based on said voltage value, and for controlling any one of or at least two of said frequency converting means, said refrigerant decompression means, said indoor heat exchanging means, and said outdoor heat exchanging means by said corrected control level of said current value.

12. The air conditioner according to claim 9, further comprising supply frequency detection means, connected to said alternating current power source, for detecting supply frequency, said control means comprising:

first means, connected to an output of said voltage detection means, for correcting the effective output voltage value of the supplied power provided from said frequency converting means to said refrigerant compression means based on said voltage value; and second means, receiving said current value detected by said current detection means and an output from said supply frequency detection means, for correcting the control level of said current value based on the output from said supply frequency detection means and for controlling any one of or at least two of said frequency converting means, said refrigerant decompression means, said indoor heat exchanging means, and said outdoor heat exchanging means by said corrected control level of said current value.

13. The air conditioner according to claim 12, wherein said second means comprises:

means, receiving said current value detected by said current detection means and the output from said supply frequency detection means, for correcting the control level of said current value and correcting a control level of a control start point to be higher than a control level of a control end point based on the output from said supply frequency detection means and for controlling any one of or at least two of said frequency converting means, said refrigerant decompression means, said indoor heat exchanging means, and said outdoor heat exchanging means by said corrected control level of said current value.

14. The air conditioner according to claim 9, wherein said refrigerant decompression means includes an expansion valve, connected to said indoor heat exchanging means and said outdoor heat exchanging means, for changing a flow of said refrigerant, the air conditioner further comprising:
   valve control means, connected to the output of said rectifying and smoothing means and receiving said direct current power, for changing a degree of restriction of said expansion valve and adjusting the flow of said refrigerant; and
   current detection means for detecting a current value of said alternating current power supplied from said alternating current power source,
said control means including
   first means, connected to the output of said voltage detection means, for correcting the effective output voltage value of the supplied power provided from said frequency converting means to said refrigerant compression means based on said voltage value, and
   second means, receiving said current value detected by said current detection means and said voltage value detected by said voltage detection means, for correcting a control level of said current value based on said voltage value and for controlling any one of or at least two of said frequency converting means, said refrigerant decompression means, said indoor heat exchanging means, said outdoor heat exchanging means, and said valve control means by said corrected control level of said current value.

\* \* \* \* \*

UNITED STATES PATENT AND TRADEMARK OFFICE
CERTIFICATE OF CORRECTION

Figure 1:
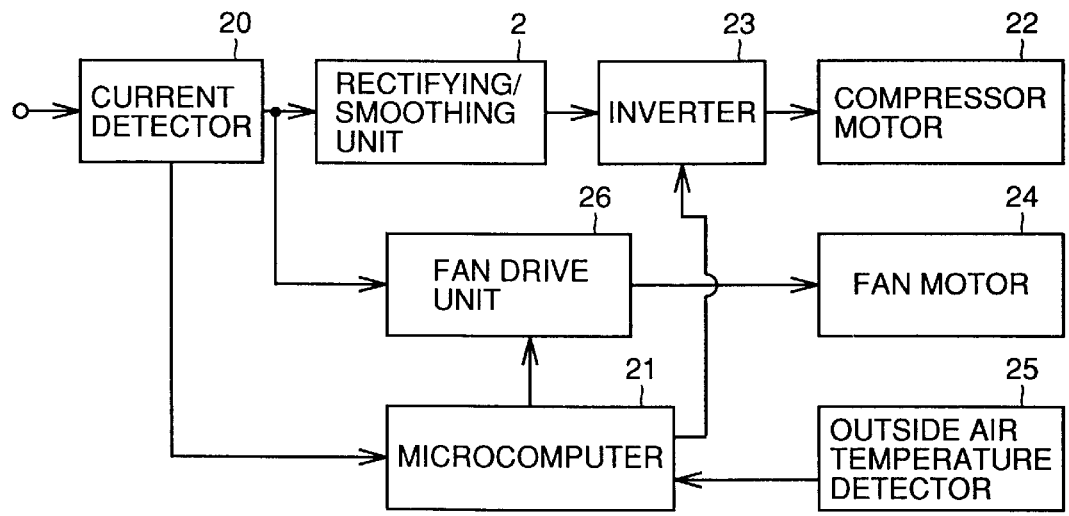
FIG. 1 is a block diagram showing a structure of a conventional air conditioner.
Figure 2:
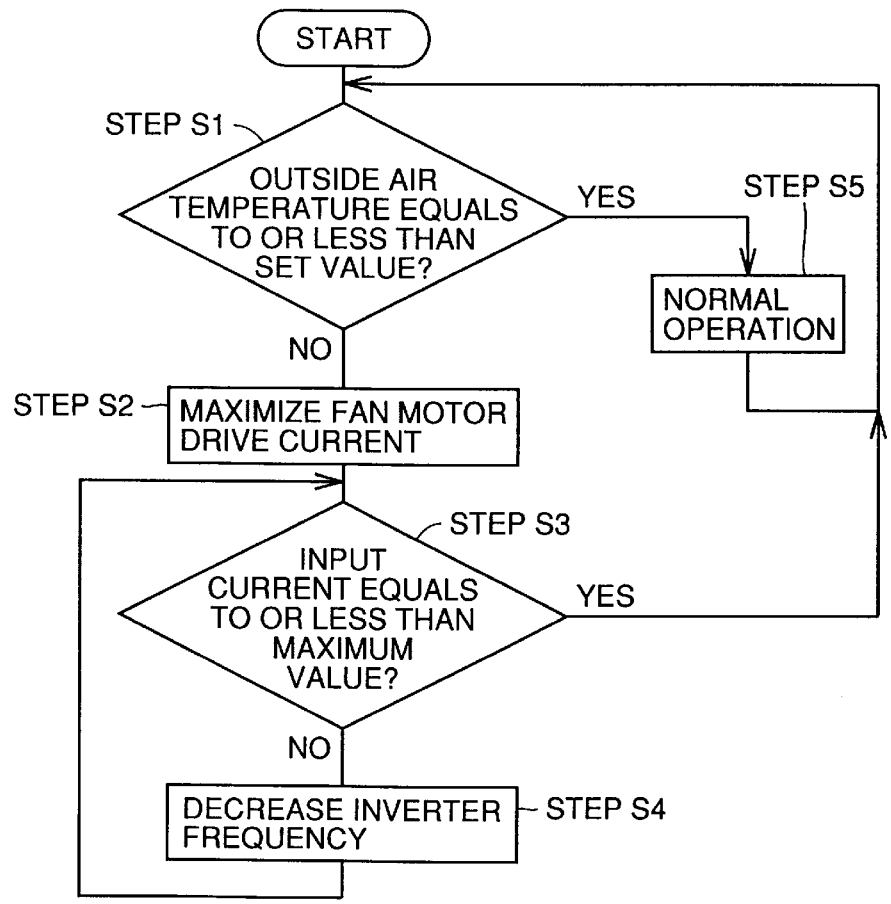
FIG. 2 shows a flow chart provided for describing an operation of the conventional air conditioner.
Figure 3:
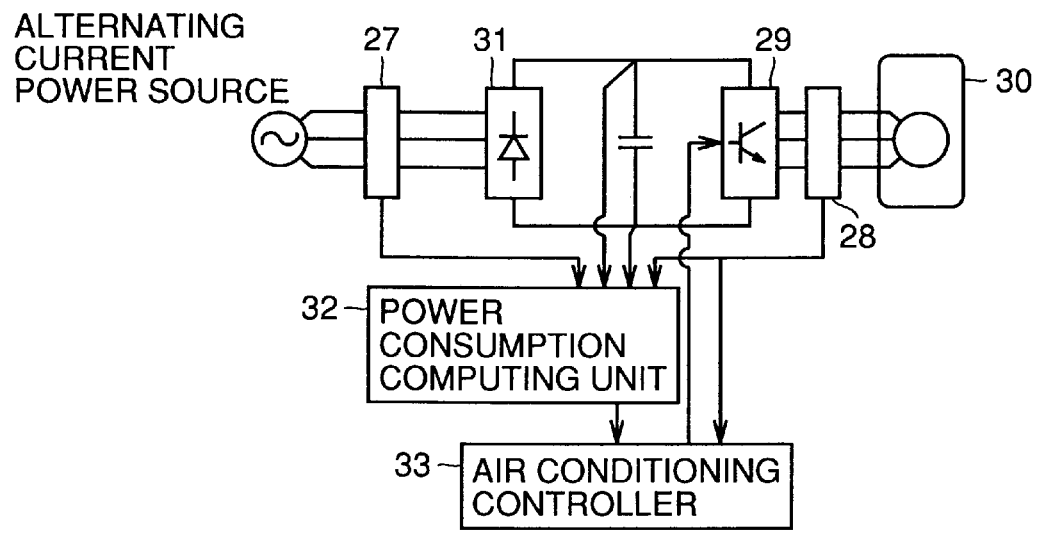
FIG. 3 is a block diagram showing a structure of a conventional air conditioner.

PATENT NO.    : 6,065,298
DATED         : May 23, 2000
INVENTOR(S)   : Satoru Fujimoto It is certified that error appears in the above-identified patent and that said Letters Patent is hereby corrected as shown below:

Drawings,
Figs. 2 and 3, should be deleted and replaced with the corrected Figs. 2 and 3, as shown on the attached page.

Column 2,
Line 45, change "an conditioner," to -- air conditioner, --;

Column 4,
Line 3, after "from" insert -- an --;

Column 8,
Line 1, after "in" insert -- a --;

Column 9,
Line 16, change "a of" to -- of a --;
Line 23, change "means connected" to -- means, connected --;
Line 58, change "means connected" to -- means, connected --;

Signed and Sealed this

Ninth Day of April, 2002

*Attest:*

*Attesting Officer*

JAMES E. ROGAN
*Director of the United States Patent and Trademark Office*